United States Patent
Liao et al.

(10) Patent No.: US 9,749,157 B2
(45) Date of Patent: Aug. 29, 2017

(54) SEQUENCE ESTIMATION DEVICE AND METHOD

(71) Applicant: MStar Semiconductor, Inc., Hsinchu Hsien (TW)

(72) Inventors: Yi-Ying Liao, Zhubei (TW); Tai-Lai Tung, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 14/878,147

(22) Filed: Oct. 8, 2015

(65) Prior Publication Data

US 2017/0063578 A1    Mar. 2, 2017

(30) Foreign Application Priority Data

Sep. 2, 2015  (TW) .............................. 104128970 A

(51) Int. Cl.
    *H04L 25/03*    (2006.01)
(52) U.S. Cl.
    CPC .. *H04L 25/03057* (2013.01); *H04L 25/03178* (2013.01)
(58) Field of Classification Search
    CPC .................. H04L 25/03331; H04L 1/0054
    USPC ......................... 375/232, 229, 230
    See application file for complete search history.

(56) References Cited

U.S. PATENT DOCUMENTS

| 5,331,662 A * | 7/1994 | Desperben ........ H04L 25/03006 375/232 |
| 7,266,146 B2 | 9/2007 | Pare, Jr. et al. |
| 2009/0244399 A1* | 10/2009 | Cohen .............. H04N 21/42607 348/726 |
| 2009/0323796 A1* | 12/2009 | Futatsugi .............. H04L 1/0054 375/232 |
| 2010/0098042 A1* | 4/2010 | Dent ...................... H04B 1/707 370/342 |
| 2014/0029661 A1* | 1/2014 | Takaoka ............ H04L 25/03159 375/232 |

OTHER PUBLICATIONS

Li et al., "An Improved Viterbi Equalization Algorithm Based on the Maximum Likelihood Sequence Estmation in GSM System", Proceedings of ICCTA2011, Oct. 2011, 4 pages.

* cited by examiner

*Primary Examiner* — Helene Tayong
(74) *Attorney, Agent, or Firm* — Edell, Shapiro & Finnan, LLC

(57) ABSTRACT

A sequence estimation device includes a grouping unit, a sequence estimation unit and a combination unit. The grouping unit groups a first plurality of equalized signals into a plurality of equalized signal groups according to a grouping rule. The sequence estimation unit, coupled to the grouping unit, processes the plurality of equalized signal groups according to a sequence estimation rule to obtain a plurality of estimated signal groups, respectively. The combination unit, coupled to the sequence estimation unit, permutes the plurality of estimated signal groups to a plurality of estimated signals according to the grouping rule.

14 Claims, 4 Drawing Sheets

SEQUENCE ESTIMATION DEVICE AND METHOD

This application claims the benefit of Taiwan application Serial No. 104128970, filed Sep. 2, 2015, the subject matter of which is incorporated herein by reference.

BACKGROUND OF THE INVENTION

Field of the Invention

The invention relates in general to a sequence estimation device and method, and more particularly to a sequence estimation device and method capable of reducing error propagation and having a low complexity level.

Description of the Related Art

Video broadcasting standards include Advanced Television System Committee (ATSC) in the U.S., Digital Video Broadcasting—Terrestrial (DVB-T) in Europe, Integrated Services Digital Broadcasting—Terrestrial (ISDB-T) in Japan, and Digital Terrestrial Multimedia Broadcast (DTMB) in China. In a digital communication system, a signal is affected by multi-path fading when transmitted via a wireless channel, and inter-symbol interference (ISI) is generated such that a receiver may not correctly recover the signal. To eliminate ISI, a receiver is usually provided with an equalizer and a sequence estimation device to estimate the transmitted signal.

Common equalizers include linear feedforward equalizers (LFEs) and decision feedback equalizers (DFEs). However, LFEs suffer from a drawback of reinforced noise, whereas DFEs also suffer from a drawback of error propagation. That is to say, when a decision is incorrect, a DFE nonetheless performs equalization on a received signal, in a way that the performance of the equalizer is reduced and more incorrect decisions are made.

On the other hand, according to received signals and all possible sequence combinations of the signals, a sequence estimation device selects a most probable signal combination. However, when the number of symbols crossed by ISI is large (e.g., when the channel is length is long) or when a modulation level of transmitted signals is high, the computation complexity of the sequence estimation device may exponentially increase. In short, when a transmitted signal has an $M^{th}$-order modulation level and a channel length of L, the complexity level is $M^L$. For example, in the DMTB standard, assuming that M is 32 and L is only 5, the complexity level of the sequence estimation device is about $32^5$—such complexity level produces enormous power consumption.

Therefore, there is a need for a solution for solving error propagation and reducing the complexity level of a sequence estimation device.

SUMMARY OF THE INVENTION

The embodiments of the invention are directed to a sequence estimation device and a sequence estimation method for solving the above issues.

The present invention discloses a sequence estimation device. The sequence estimation device includes: a grouping unit, configured to receive a first plurality of equalized signals, and to group the first plurality of equalized signals into a plurality of equalized signal groups; a sequence estimation unit, coupled to the grouping unit, configured to process the plurality of equalized signal groups according to a sequence estimation rule to obtain a plurality of estimated signal groups, respectively; and a combination unit, coupled to the sequence estimation unit, configured to permute the plurality of estimated signal groups to a plurality of estimated signals according to the grouping rule.

The present invention further discloses a sequence estimation method for a sequence estimation device. The sequence estimation method includes: receiving a first plurality of equalized signals, and grouping the first plurality of equalized signals into a plurality of equalized signal groups according to a grouping rule by a grouping unit; processing the plurality of equalized signal groups according to a sequence estimation rule by a sequence estimation unit to obtain a plurality of estimated signal groups, respectively; and permuting the plurality of estimated signal groups to a plurality of estimated signals according to the grouping rule by a combination unit.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
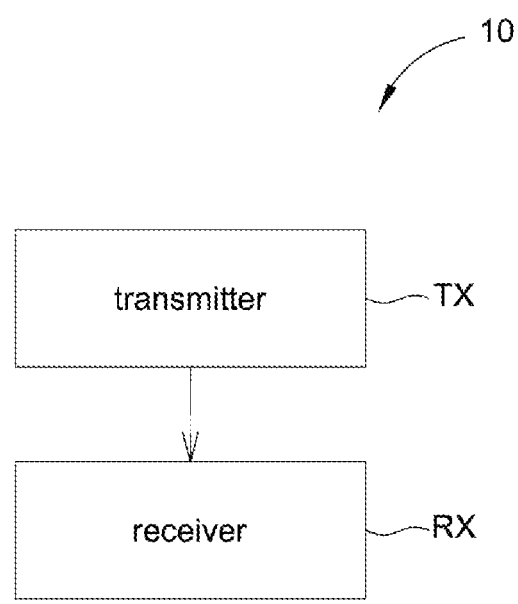
FIG. 1 is a schematic diagram of a communication system according to an embodiment of the present invention.

FIG. 1 shows a schematic diagram of a communication system 10 according to an embodiment of the present invention. The communication system 10 may be a communication system that uses single-carrier technologies or orthogonal frequency-division multiplexing (OFDM) technologies, and is chiefly formed by a transmitter TX and a receiver RX. In FIG. 1, the transmitter TX and the receiver RX are for illustrating the architecture of the communication system 10. For example, the communication system 10 may be a wired communication system such as an asymmetric digital subscriber line (ADSL) system or a power line communication (PLC) system, or a wireless communication system such as a wireless local area network (WLAN), a Digital Terrestrial Multimedia Broadcast (DTMB) system or a Long Term Evolution-Advanced (LTE-A) system. Further, for example but not limited to, the transmitter TX and the receiver RX may be disposed in a device such as a cell phone, a laptop computer, a tablet computer, an e-book or a portable computer system.

Figure 2:
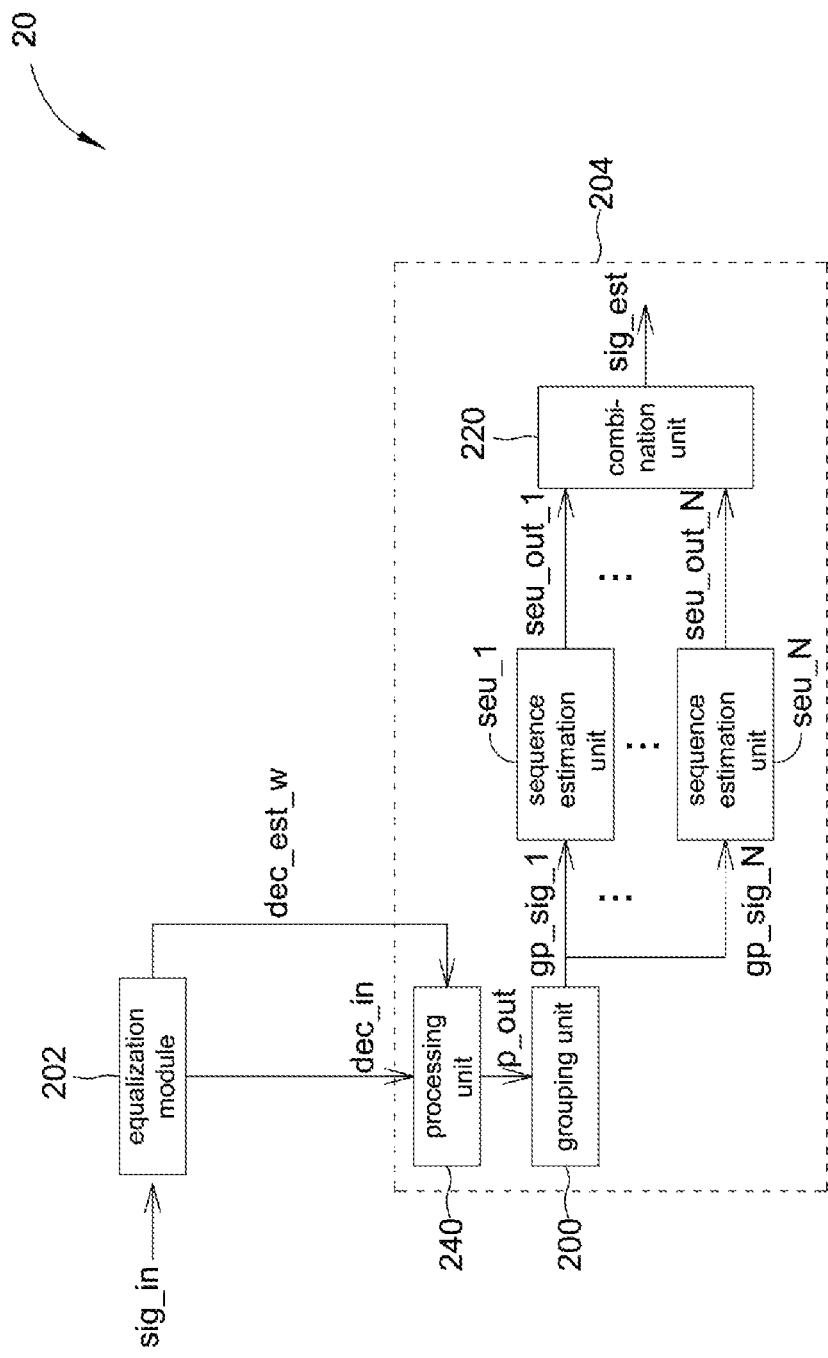
FIG. 2 is a schematic diagram of a sequence estimation device according to an embodiment of the present invention.

FIG. 2 shows a schematic diagram of a sequence estimation device 20 according to an embodiment of the present invention. The sequence estimation device 20 is implemented in the receiver RX in FIG. 1 to estimate transmitted signals. The sequence estimation device 20 includes an equalization module 202 and a sequence detection module 204. The sequence detection module 204 includes a grouping unit 200, a plurality of sequence estimation units seu_1 to seu_N, and a combination unit 220. More specifically, the grouping unit 200 receives a plurality of equalized signals p_out, and groups the plurality of equalized signals p_out into a plurality of equalized signal groups pg_sig_1 to gp_sig_N according to a grouping rule. The plurality of sequence estimation units seu_1 to seu_N, coupled to the grouping unit 200, process the plurality of equalized signal groups gp_sig_1 to gp_sig_N according to a sequence estimation rule to obtain (e.g., to recover) a plurality of estimated signal groups seu_out_1 to seu_out_N, respectively. The combination unit 220, coupled to the plurality of sequence estimation units seu_1 to seu_N, permutes the plurality of estimated signal groups seu_out_1 to seu_out_N to a plurality of estimated signals sig_est according to the grouping rule. More specifically, the combination unit 220 permutes the plurality of estimated signal groups seu_out_1 to seu_out_N to a plurality of estimated signals sig_est according to a combination rule corresponding to the grouping rule. Thus, the receiver RX may perform a decision process according to the plurality of estimated signals sig_est to further obtain transmitted bit signals.

There are numerous ways to implement the sequence detection module 204. For example, to reduce the complexity level of the sequence detection module 204, the grouping rule applied to the grouping unit 200 may cause differences between indices of adjacent equalized signals in each of equalized signal groups gp_sig_1 to gp_sig_N to be the same. That is to say, the plurality of equalized signals p_out are evenly and sequentially grouped into multiple signal groups. The sequence estimation rule applied to the plurality of sequence estimation units seu_1 to seu_N may be a maximum-likelihood sequence estimation (MLSE) rule. Further, there are numerous ways to implement the MLSE rule. For example, the plurality of sequence estimation units seu_1 to seu_N may perform a Viterbi algorithm to implement the MLSE rule to process the plurality of equalized signal groups gp_sig_1 to gp_sig_N to obtain (e.g., to recover) the plurality of estimated signal groups seu_out_1 to seu_out_N, respectively. Thus, the sequence detection module 204 not only obtains transmitted bit signals according to the plurality of estimated signals sig_est, but also divides a sequence estimation unit having a higher complexity level into a plurality of sequence estimation units seu_1 to seu_N having a lower complexity level to achieve an effect of reducing the complexity level.

Further, to alleviate error propagation, the sequence detection module 204 may further include a processing unit 240 coupled to the grouping unit 200. The processing unit 240 receives a plurality of equalized signals dec_in (e.g., received signals that have been equalized), and generates the plurality of equalized signals p_out according to the plurality of equalized signals dec_in and a plurality of corresponding weighted estimated signals dec_est_w. That is to say, before providing the equalized signals to the grouping unit, the sequence detection module 204 may process the equalized signals to alleviate error propagation, thereby preventing the error propagation from degrading the performance of the sequence estimation units seu_1 to seu_N.

The equalization module 202, coupled to the processing unit 240, receives a plurality of signals sig_in (e.g., baseband received signals), equalizes the plurality of signals sig_in to the plurality of equalized signals dec_in, and generates the plurality of corresponding weighted estimated signals dec_est_w. For example but not limited to, the plurality of signals sig_in may be a plurality of single-carrier signals transmitted according to the DTMB standard, or signals transmitted according to other wireless communication standards. Further, the plurality of signals sig_in may include frames and a frame header of a next frame. That is to say, the sequence estimation device 20 may simultaneously utilize the headers in multiple frames to improve the estimation performance of one single frame.

Thus, the sequence estimation device 20 can estimate transmitted signals while alleviating error propagation and reducing the complexity level of realizing the MLSE rule. Further, if the transmitted signals are encoded (e.g., error correction codes), the sequence estimation device 20 may further provide the estimated signals to a decoder to decode the estimated signals.

Figure 3:
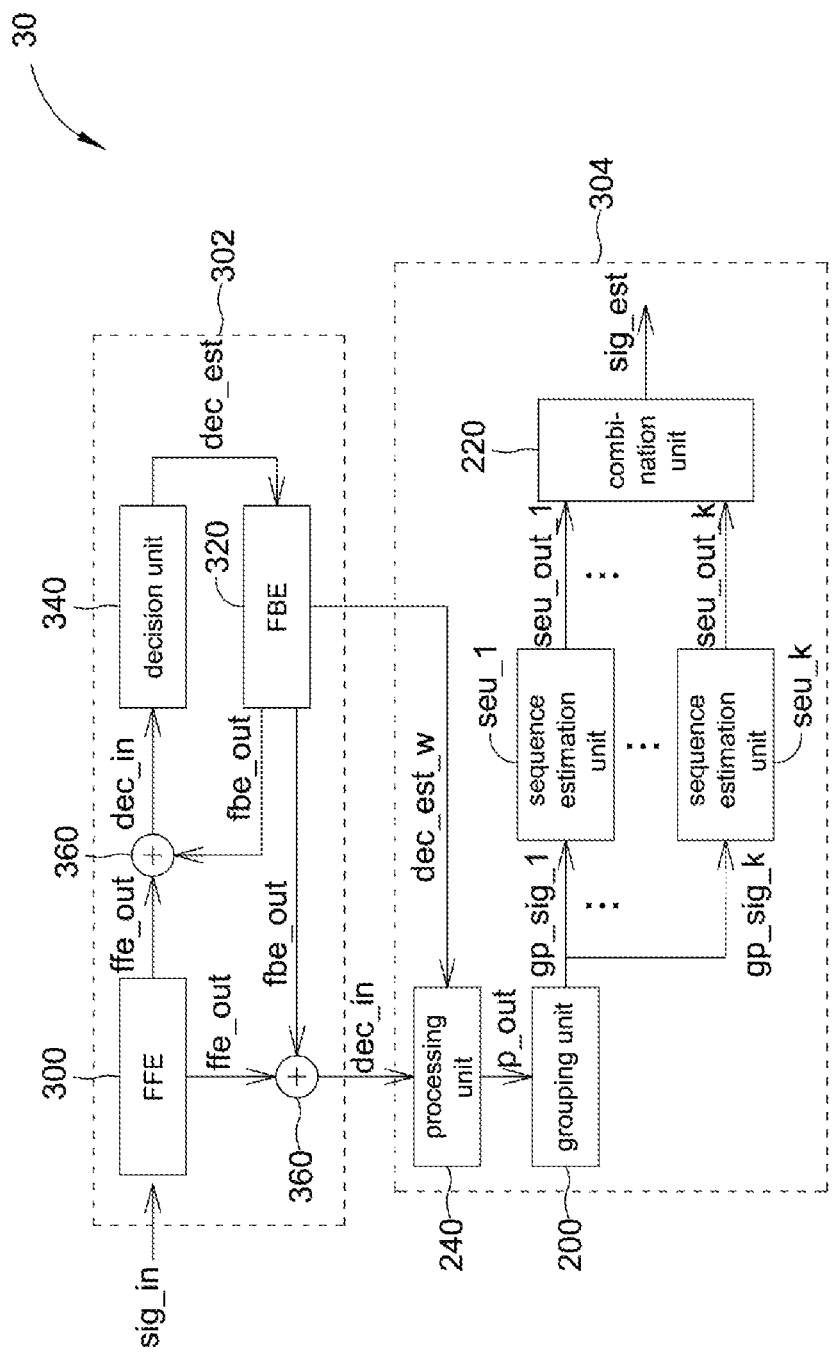
FIG. 3 is a schematic diagram of a sequence estimation device according to an embodiment of the present invention.

FIG. 3 shows a schematic diagram of a sequence estimation device 30 according to an embodiment of the present invention. The sequence estimation device 30 is implemented in the receiver RX in FIG. 1 and illustrated to further explain operations of FIG. 2. The sequence estimation device 30 includes an equalization module 302 and a sequence detection module 304. To better explain the operations of the sequence estimation device 30, for example but not limited to, the equalization module 302 may be a decision feedback equalization module. Functions and operations of the sequence detection module 304 may be referred from the description associated with the sequence detection module 204, and shall be omitted herein.

More specifically, the equalization module 302 includes a feedforward equalizer (FFB) 300, a feedback equalizer (FBE) 320, a decision device 340 and an adder 360. The FFE 300 and the FBE 320 respectively include a plurality of FFE weights and FBE weights for equalizing respective input signals. That is to say, the FFE 300 generates a plurality of feedforward weighted signals ffe_out according to a plurality of signals sig_in (e.g., baseband received signals) and the plurality of FFE weights. The FBE 320, coupled to the decision device 340, generates a plurality of feedback weighted signals fbe_out according to a plurality of corresponding decision signals dec_est and the plurality of FBE weights. The adder 360, coupled to the FFE 300 and the FBE 320, generates a plurality of equalized signals dec_in according to the plurality of feedforward weighted signals ffe_out and the plurality of feedback weighted signals fbe_out (e.g., dec_in=ffe_out+fbe_out). The decision device 340, coupled to the adder 360, generates (e.g., through demodulation) a plurality of corresponding decision signals dec_est according to the plurality of equalized signals dec_in. In one embodiment, the adder 360 coupled to the adder 360 coupled to the FFE 300 and the FBE 320, and the adder 360 coupled to the decision device 340 may be the same adder.

Further, the equalization module 302 may generate a plurality of corresponding weighted estimated signals dec_est_w according to a maximum FBE weight fbe_w_max in the plurality of FBE weights and the plurality of corresponding decision signals dec_est (e.g., dec_est_w=fbe_w_max*dec_est). The equalization module 302 may further generate an error value according to the plurality of equalized signals dec_in and the plurality of corresponding decision signals dec_est. The error value may be used to adjust (and correct) the plurality of FFE weights and the plurality of FBE weights, with such details omitted herein.

According to the above description, an embodiment is further provided below to more specifically explain a relationship between signals and weights. The equalization module 302 first generates according to a plurality of signals $y_n$ (e.g., sig_in in FIG. 3) a plurality of equalized signals $z_n$ (e.g., dec_in in FIG. 3) and a plurality of corresponding weighted estimated signals $b_{k'} \hat{x}_{n-k'}$ (e.g., dec_est_w in FIG. 3), where $\hat{x}_n$ is a corresponding decision signal (e.g., dec_est in FIG. 3), $b_{k'}$ is an FBE weight, k' is an index of the FBE weight and n is a time index. The FBE weights may include $b_1, b_2, \ldots, b_{h-1}$ and $b_h$, where h is a tap. Assume that $b_k$ is an FBE weight having maximum strength in all of the $b_1$, $b_2, \ldots, b_{h-1}$ and $b_h$, and k is the index. To alleviate the issue of error propagation the equalization module may generate, the processing unit 240 in the sequence detection module 304 may generate a plurality of equalized signals $r_n$ (e.g., p_out in FIG. 3) according to the plurality of equalized signals $z_n$ and the plurality of corresponding weighted estimated signals $b_k \hat{x}_{n-k}$. There are numerous ways to generate the plurality of equalized signals $r_n$. For example but not limited to, the plurality of equalized signals $r_n$ may be generated according to an equation $r_n = z_n - b_k \hat{x}_{n-k}$. The plurality of equalized signals $r_n$ may include $r_0, r_1, r_2, \ldots, r_k$, $r_{k+1}$ and $r_{k+2}$.

Before estimating the plurality of equalized signals $r_n$, in order to reduce the complexity level of the sequence detection module 304, the grouping unit 200 may group the plurality of equalized signals $r_n$ into k equalized signal groups (e.g., gp_sig_1 to gp_sig_k in FIG. 3) according to a grouping rule. For example, the grouping unit 200 may group the equalized signals $r_n$ into k groups according to the index k corresponding to the maximum FBE weight, and causes the differences between indices of adjacent equalized signals of each of the equalized signal groups to be equal to k. More specifically, the $1^{st}$ equalized signal group (e.g., gp_sig_1) may include equalized signals $r_0, r_k, r_{2k}, r_{3k}, \ldots$, the $2^{nd}$ equalized signal group (e.g., gp_sig_2) may include equalized signals $r_1, r_{k+1}, r_{2k+1}, r_{3k+1}, \ldots$, the $k^{th}$ equalized signal group (e.g., gp_sig_k) may include equalized signals $r_{k-1}, r_{2k-1}, r_{3k-1}, r_{4k-1}, \ldots$, and so forth. In one embodiment, the grouping unit 200 may include a buffer memory and a memory controller. The plurality of equalized signals $r_n$ may be continuously stored in the buffer memory. The memory controller determines the indices of respective equalized signals according to addresses at which the equalized signals $r_n$ are stored, so as to further group the equalized signals $r_0, r_k, r_{2k}, r_{3k}, \ldots$ to the $1^{st}$ equalized signal group (e.g., gp_sig_1), the equalized signals $r_1, r_{k+1}, r_{2k+1}, r_{3k+1}$ to the $2^{nd}$ equalized signal group (e.g., gp_sig_2), and so forth.

Next, the plurality of sequence estimation units seu_1 to seu_k respectively estimate the k equalized signal groups according to an estimation rule (e.g., through implementing an Viterbi algorithm) to obtain (e.g., to recover) the k corresponding estimated signal groups $\tilde{x}_n$ (e.g., seu_out_1 to seu_out_k). More specifically, the sequence estimation unit seu_1 may process the equalized signals $r_0, r_k, r_{2k}, r_{3k}, \ldots$ in the $1^{st}$ equalized signal group to obtain (e.g., to recover) the estimated signal group $\tilde{x}_0, \tilde{x}_k, \tilde{x}_{2k}, \tilde{x}_{3k}, \ldots$ (e.g., seu_out_1 in FIG. 3) corresponding to the $1^{st}$ equalized signal group; the sequence estimation unit seu_2 may process the equalized signals $r_1, r_{k+1}, r_{2k+1}, r_{3k+1}, \ldots$ in the $2^{nd}$ equalized signal group to obtain (e.g., to recover) the estimated signal group $\tilde{x}_1, \tilde{x}_{k+1}, \tilde{x}_{2k+1}, \tilde{x}_{3k+1}, \ldots$ (e.g., seu_out 2 in FIG. 3) corresponding to the $2^{nd}$ equalized signal group; the sequence estimation unit seu_k may process the equalized signals $r_{k-1}, r_{2k-1}, r_{3k-1}, r_{4k-1}, \ldots$ in the $k^{th}$ equalized signal group to obtain (e.g., to recover) the estimated signal group $\tilde{x}_{k-1}, \tilde{x}_{2k-1}, \tilde{x}_{3k-1}, \tilde{x}_{4k-1}, \ldots$ (e.g., seu_out_k in FIG. 3) corresponding to the $k^{th}$ equalized signal group; and so forth. In another embodiment, the plurality of sequence estimation units seu_1 to seu_k may be implemented by one single digital logic circuit that implements a Viterbi algorithm. The one single logic circuit sequentially processes the k equalized signal groups in different timeslots to sequentially obtain (e.g., recover) the k corresponding estimated signal groups.

After the estimated signals are grouped, the combination unit 220 may permute the k corresponding estimated signal groups to obtain the estimated signals $\tilde{x}_0, \tilde{x}_1, \ldots, \tilde{x}_{k-1}, \tilde{x}_k, \tilde{x}_{k+1}, \ldots, \tilde{x}_{2k-1}, \tilde{x}_{2k}, \tilde{x}_{2k+1}, \ldots$ (e.g., sig_est in FIG. 3) corresponding to the plurality of signals $y_n$. In one embodiment, the combination unit 220 may include a buffer memory and a memory controller, and the estimated signals of the plurality of signals $y_n$ are continuously stored in the buffer memory. More specifically, the memory controller may identify addresses at which the estimated signals are stored according to the indices of respective estimated signals to further store the estimated signals $\tilde{x}_0, \tilde{x}_1, \ldots, \tilde{x}_{k-1}, \tilde{x}_k, \tilde{x}_{k+1}, \ldots, \tilde{x}_{2k-1}, \tilde{x}_{2k}, \tilde{x}_{2k+1}, \ldots$; to the continuously arranged corresponding addresses in the buffer memory. The combination unit 220 then sequentially outputs the estimated signals $\tilde{x}_0, \tilde{x}_1, \ldots, \tilde{x}_{k-1}, \tilde{x}_k, \tilde{x}_{k+1}, \ldots, \tilde{x}_{2k-1}, \tilde{x}_{2k}, \tilde{x}_{2k+1}, \ldots$.

Thus, through operations of the grouping unit 200, the sequence estimation units seu_1 to seu_k and the combination unit 220, the sequence detection module 304 divides an estimation computation having a high complexity level to k sets of estimation computations having a low complexity level, hence achieving the effect of greatly reducing the complexity level.

It should be noted that, there are numerous ways to implement the foregoing grouping unit, sequence estimation units and combination unit. In one embodiment, the plurality of sequence estimation units may be integrated into one single sequence estimation unit, which processes a plurality of equalized signal groups in different timeslots. Further, the grouping unit, the sequence estimation units and the combination unit may be implemented by application-specific integrated circuits (ASICs). That is, the grouping unit, the sequence estimation units and the combination unit may be respectively implemented with a grouping circuit, a sequence estimation circuit and a combination circuit.

Figure 4:
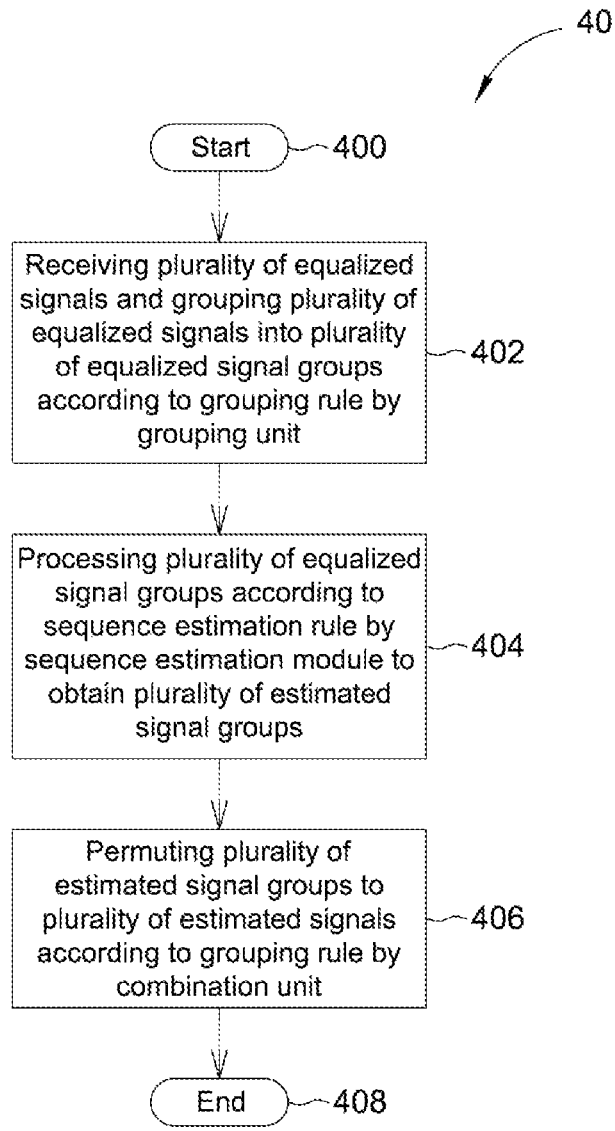
FIG. 4 is a flowchart of a sequence estimation method according to an embodiment of the present invention.

Operations of the foregoing sequence estimation module (e.g., the sequence detection module 204 or the sequence detection module 304) may be further concluded into one process 40, as shown in FIG. 4. The process 40 includes following steps.

In step 400, the process begins.

In step 402, a plurality of equalized signals are received and are grouped into a plurality of equalized signal groups according to a grouping rule by a grouping unit.

In step 404, according to a sequence estimation rule, the plurality of equalized signal groups are processed to obtain a plurality of estimated signal groups by a sequence estimation unit, respectively.

In step 406, according to the grouping rule, the plurality of estimated signal groups are permuted to a plurality of estimated signals by a combination unit.

In step 408, the process ends.

In the process 40, the sequence detection module may use a grouping unit to receive the plurality of equalized signals and to group the plurality of equalized signals into a plurality of equalized signal groups according to a grouping rule, and use a sequence estimation unit to process the plurality of equalized signal groups according to a sequence estimation rule to obtain (e.g., to recover) a plurality estimated signals, respectively. Next, the sequence detection module may use a combination unit to permute the plurality of equalized signal groups to a plurality of estimated signals.

The process 40 is for illustrating operations of the sequence detection module. Details and variations of the sequence detection module may be referred from the foregoing description, and shall be omitted herein.

In conclusion, the present invention provides a sequence estimation device and method for estimating transmitted signals. The sequence estimation device includes an equalization module and a sequence estimation module, and is capable of obtaining estimated signals under conditions of low error propagation and a low complexity level.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A sequence estimation device of a communications receiver, comprising:
   a grouping circuit, configured to receive a first plurality of equalized signals, and to group the first plurality of equalized signals into a plurality equalized signal groups according to a grouping rule;
   a sequence estimation circuit, coupled to the grouping circuit, configured to process the plurality of equalized signal groups according to a sequence estimation rule to obtain a plurality of estimated signal groups;
   a combination circuit, coupled to the sequence estimation circuit, configured to permute the plurality of estimated signal groups to a plurality of estimated signals according to the grouping rule;
   a processing circuit, coupled to the grouping circuit, configured to receive a second plurality of equalized signals, and to generate the first plurality of equalized signals according to the second plurality of equalized signals and a plurality of corresponding weighted estimated signals; and
   an equalization circuit, coupled to the processing circuit, configured to receive a plurality of signals, to equalize the plurality of signals into the second plurality of equalized signals, and to generate the plurality of corresponding weighted estimated signals.

2. The sequence estimation device according to claim 1, wherein the grouping rule causes differences between indices of adjacent equalized signals in each of the plurality of equalized signal groups to be the same.

3. The sequence estimation device according to claim 1, wherein the sequence estimation rule is a maximum-likelihood sequence estimation (MLSE) rule.

4. The sequence estimation device according to claim 3, wherein the sequence estimation circuit performs a Viterbi algorithm to process the plurality of equalized signal groups according to the MLSE rule to obtain the plurality of estimated signal groups, respectively.

5. The sequence estimation device according to claim 1, wherein the equalization circuit comprises a feedback equalizer comprising a plurality of feedback equalizer weights, and the equalization circuit generates the plurality of corresponding weighted estimated signals according to a maximum feedback equalizer weight of the plurality of feedback equalizer weights and a plurality of corresponding decision signals.

6. The sequence estimation device according to claim 1, wherein the plurality of signals comprise a plurality of single-carrier signals according to a Digital Terrestrial Multimedia Broadcast (DTMB) standard.

7. The sequence estimation device according to claim 1, wherein the plurality of signals comprise a frame and a frame header of a next frame.

8. A sequence estimation method, applied to a sequence estimation device of a communications receiver, the method comprising:
   receiving a first plurality of equalized signals, and grouping the first plurality of equalized signals into a plurality equalized signal groups according to a grouping rule by a grouping circuit;
   processing the plurality of equalized signal groups according to a sequence estimation rule by a sequence estimation circuit to obtain a plurality of estimated signal groups;
   permuting the plurality of estimated signal groups to a plurality of estimated signals according to the grouping rule by a combination circuit;
   receiving a second plurality of equalized signals, and generating the first plurality of equalized signals according to the second plurality of equalized signals and a plurality of corresponding weighted estimated signals by a processing circuit; and
   receiving a plurality of signals, equalizing the plurality of signals into the second plurality of equalized signals, and generating the plurality of corresponding weighted estimated signals by an equalization circuit.

9. The sequence estimation method according to claim 8, wherein the grouping rule causes differences between indices of adjacent equalized signals in each of the plurality of equalized signal groups to be the same.

10. The sequence estimation method according to claim 8, wherein the sequence estimation rule is a maximum-likelihood sequence estimation (MLSE) rule.

11. The sequence estimation method according to claim 10, wherein the step of processing the plurality of equalized signal groups according to the sequence estimation rule by the sequence estimation circuit to obtain the plurality of estimated signal groups, respectively, comprises:
   performing a Viterbi algorithm to process the plurality of equalized signal groups according to the MLSE rule to obtain the plurality of estimated signal groups, respectively.

12. The sequence estimation method according to claim 8, wherein the step of receiving the plurality of signals, equalizing the plurality of signals into the second plurality of equalized signals, and generating the plurality of corresponding weighted estimated signals by the equalization circuit comprises:
   generating the plurality of corresponding weighted estimated signals according to a maximum feedback equalizer weight of the plurality of feedback equalizer weights and a plurality of corresponding decision signals.

13. The sequence estimation method according to claim 8, wherein the plurality of signals comprise a plurality of single-carrier signals according to a Digital Terrestrial Multimedia Broadcast (DTMB) standard.

14. The sequence estimation method according to claim 8, wherein the plurality of signals comprise a frame and a frame header of a next frame.

* * * * *